(12) United States Patent
Tsai

(10) Patent No.: US 8,294,307 B2
(45) Date of Patent: Oct. 23, 2012

(54) APPARATUS AND METHOD FOR VOLTAGE CONTROLLING USED IN A PORTABLE ELECTRONIC DEVICE

(75) Inventor: Meng-Che Tsai, Taipei (TW)

(73) Assignee: MStar Semiconductor Inc. (TW)

( * ) Notice: Subject to any disclaimer, the term of this patent is extended or adjusted under 35 U.S.C. 154(b) by 0 days.

(21) Appl. No.: 12/189,453

(22) Filed: Aug. 11, 2008

(65) Prior Publication Data

US 2011/0121810 A1    May 26, 2011

(30) Foreign Application Priority Data

Aug. 10, 2007   (TW) ............................... 96129498 A

(51) Int. Cl.
*H02J 7/00*   (2006.01)
(52) U.S. Cl. ........................................... 307/150
(58) Field of Classification Search ................ 307/150, 307/151
See application file for complete search history.

(56) References Cited

U.S. PATENT DOCUMENTS

| | | | | |
|---|---|---|---|---|
| 5,567,996 | A * | 10/1996 | Yu ................................. | 307/125 |
| 7,861,277 | B2 * | 12/2010 | Keady et al. ................... | 725/127 |
| 2003/0080630 | A1 * | 5/2003 | Liu ............................... | 307/150 |
| 2007/0126290 | A1 * | 6/2007 | Jaynes et al. .................. | 307/150 |

* cited by examiner

*Primary Examiner* — Shawn Riley

(57) ABSTRACT

An apparatus for voltage controlling used in a portable electronic device includes an HDMI connector, a detector and a voltage selector. The HDMI connector is to establish a connection with an external device. The detector is to detect whether the connection is established by detecting a voltage of a hot plug detect pin of the HDMI connector and to further compare the voltage to a threshold voltage so as to generate a control signal accordingly. The voltage selector is to select one of a first voltage and a second voltage based on the control signal and to further output the selected voltage to a power pin of the HDMI connector. In the apparatus, the control signal orders the voltage selector to select the second voltage if the voltage is not lower than the threshold voltage, and to select the first voltage otherwise.

14 Claims, 6 Drawing Sheets

APPARATUS AND METHOD FOR VOLTAGE CONTROLLING USED IN A PORTABLE ELECTRONIC DEVICE

BACKGROUND OF INVENTION

1. Field of the Invention

The present invention relates to a portable electronic device with High-Definition Multimedia Interface (HDMI), and more particularly to an apparatus and method for voltage controlling used in a portable electronic device.

2. Description of the Prior Art

The High-Definition Multimedia Interface (HDMI) is designed for the next generation of multimedia equipments and suitable for use in a digital television, DVD player, DVD recorder, personal video recorder (PVR), Set-Top Box (STB) and other digital AV products. The major feature of the HDMI is that the video and audio signals are transmitted simultaneously, which is distinct from the traditional manner where the video and audio signals are separately transmitted. The HDMI adopts non-compressed digital data transmission, thereby effectively reducing the signal interference and attenuation resulted from the digital and analog conversion.

In the HDMI specification, the HDMI includes a power pin which provides a power source of 5 volts. In an electronic device with the HDMI, when the power source of the electronic device is not 5 volts, a voltage conversion is needed to convert the power source to 5 volts, even though the electronic device is not connected to an external device through the HDMI. However, the voltage conversion will cause a loss of electric power. In particular, when the power source of the electronic device is a battery, such in the case of a mobile phone, digital player, notebook computer, etc., this loss of electric power will use up the battery power rapidly, and thus substantially shorten the use time of the electronic device.

SUMMARY OF INVENTION

It is therefore one objective of the present invention to provide an apparatus and method for voltage controlling used in a portable electronic device with the HDMI to avoid the problem of prior arts, so as to save electric power.

An apparatus for voltage controlling used in a portable electronic device is provided. The portable electronic device is capable of establishing a connection with an external device. The apparatus comprises a detector and a voltage selector. The detector is for detecting whether the connection is established, so as to generate a control signal accordingly. The voltage selector is for selecting a voltage from a first voltage and a second voltage based on the control signal, wherein the first voltage is lower than the second voltage.

In one embodiment, the apparatus further comprises a DC-to-DC converter for converting the first voltage into the second voltage.

A method for voltage controlling used in a portable electronic device is provided. The method comprises steps of: detecting whether the connection is established, so as to generate a control signal accordingly, and selecting a voltage from a first voltage and a second voltage based on the control signal, wherein the first voltage is lower than the second voltage.

In one embodiment, the method further comprises step of converting the first voltage into the second voltage.

DETAILED DESCRIPTION

Figure 1A:
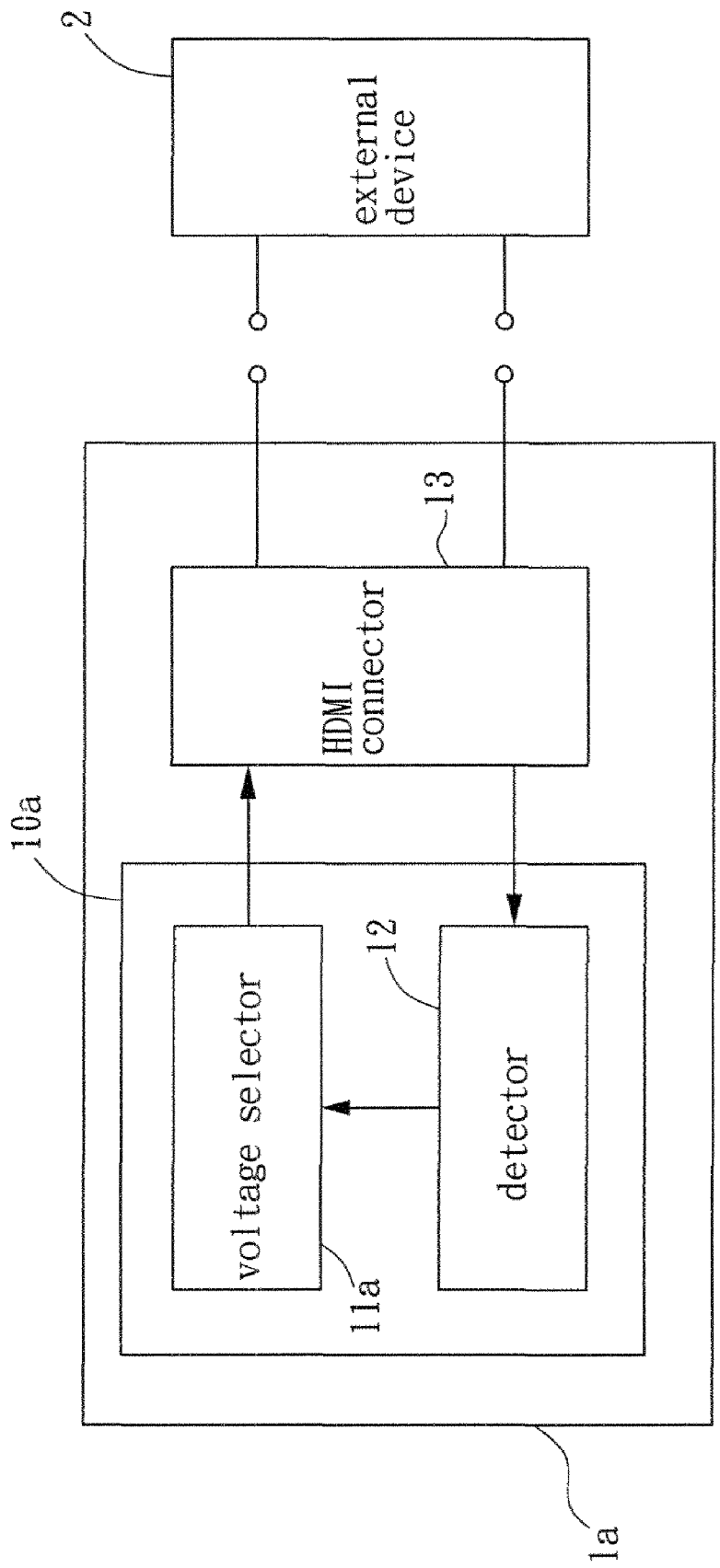
FIG. 1A is a block diagram of a voltage controlling apparatus according to an embodiment of the present invention.

FIG. 1A is a block diagram of a voltage controlling apparatus 10a according to an embodiment of the present invention. The voltage controlling apparatus 10a is used in a portable electronic device 1a, for example but not limited to a mobile phone, digital player, notebook computer, personal digital assistance (PDA), etc. The portable electronic device 1a is capable of establishing a connection with an external device, e.g. a digital display device such as a digital projector, plasma television, LCD television, etc., via a HDMI connector 13, thereby presenting digital video and audio signals of HDMI format outputted by the portable electronic device 1a. The voltage controlling apparatus 10a includes a voltage selector 11a and a detector 12. The voltage selector 11a selects a voltage from a first voltage and a second voltage according to a control signal generated by the detector 12. The selected voltage is outputted to a power pin of the HDMI connector 13. The second voltage is equal to the specific voltage of a power signal of the HDMI. According to the most recent HDMI specification (Version 1.3a), the voltage of the power signal of the power pin is +5 volts.

The detector 12 detects whether the portable electronic device 1a establishes a connection with the external device 2 via HDMI, so as to generate the control signal to the voltage selector 11a. In one embodiment, the detector 12 detects the connection by detecting the voltage of the hot plug detect pin of the HDMI connector 13 and comparing the voltage of the hot plug detect pin with reference to a threshold voltage which corresponds to the first voltage. When the detected voltage of the hot plug detect pin is not lower than the threshold voltage, it means the connection is established, and the detector 12 generates the control signal to control the voltage selector 11a to select the second voltage; otherwise, when the detected voltage of the hot plug detect pin is lower than the threshold voltage, it means the connection is not established, and the detector 12 generates the control signal to control the voltage selector 11a to select the first voltage.

Figure 1B:
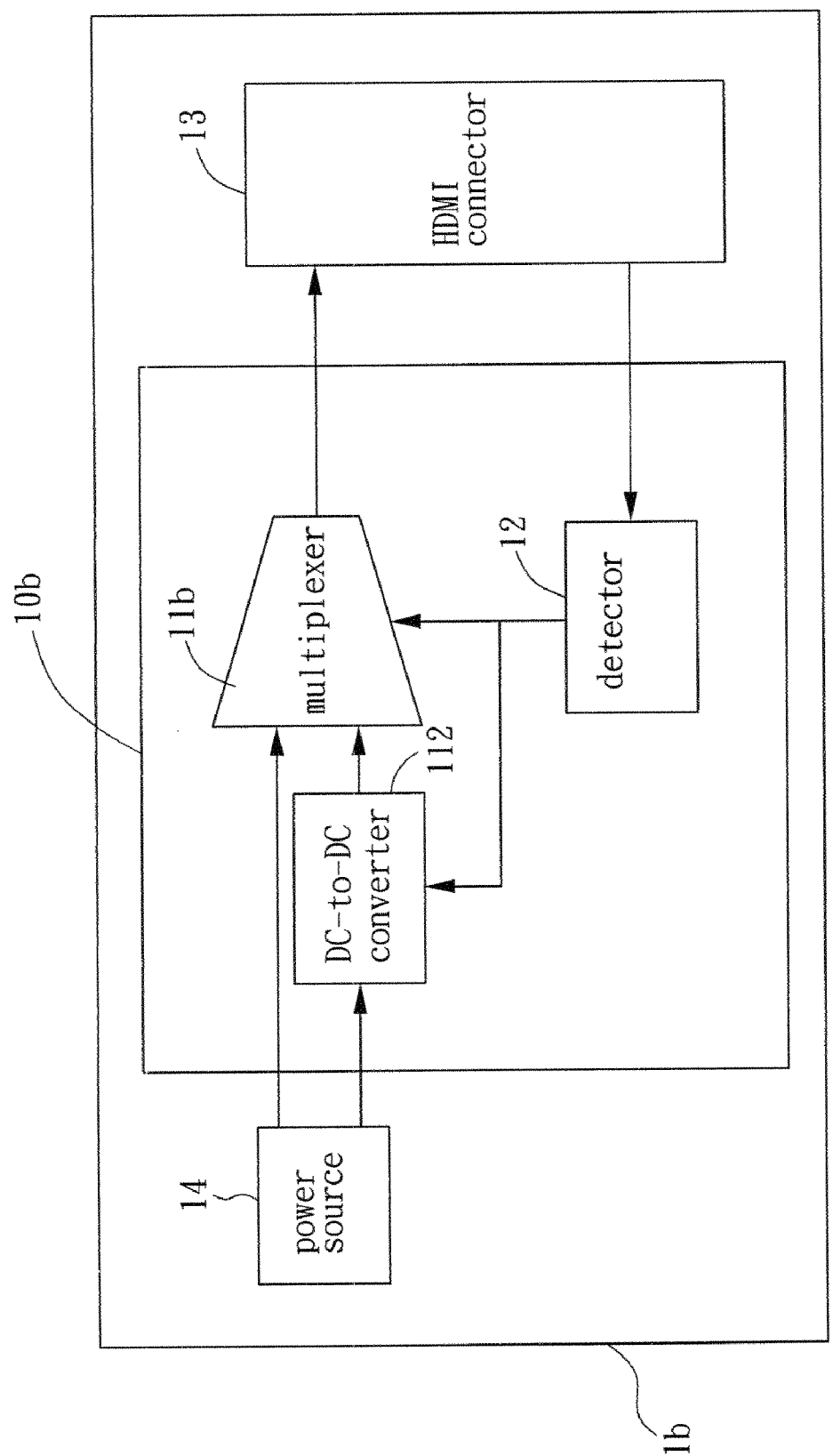
FIG. 1B is a block diagram of a voltage controlling apparatus according to a preferred embodiment of the present invention.

FIG. 1B is a block diagram of a voltage controlling apparatus 10b according to a preferred embodiment of the present invention, wherein the voltage controlling apparatus 10b further includes a DC-to-DC converter 112. In this embodiment, the voltage selector is performed by the multiplexer 11b. According to the control signal generated by the detector 12, the DC-to-DC converter 112 selectively converts the voltage of the power source 14 provided by a portable electronic device 1b into the second voltage. Then, the multiplexer 11b outputs one of the voltage of the power source 14 and the second voltage generated by the DC-to-DC converter 112 according to the control signal. That is, the voltage controlling apparatus 10b directly uses the voltage of the power source 14 as the first voltage.

Figure 1C:
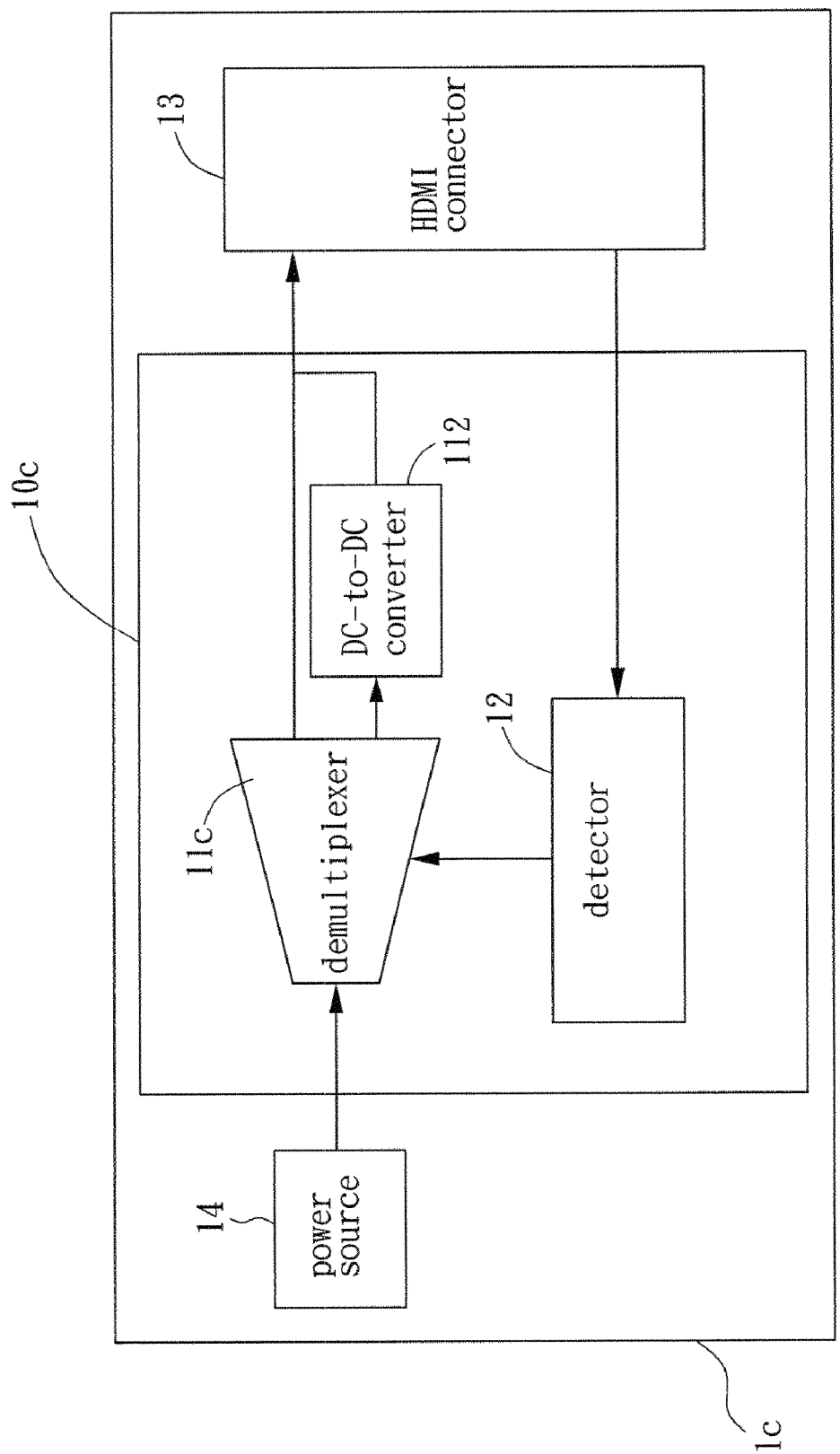
FIG. 1C is a block diagram of a voltage controlling apparatus according to another preferred embodiment of the present invention.

FIG. 1C is a block diagram of a voltage controlling apparatus 10c according to another preferred embodiment of the present invention. In this embodiment, the voltage selector is performed by the demultiplexer 11c. According to the control signal generated by the detector 12, the demultiplexer 11c outputs the voltage of the power source 14 provided by a portable electronic device 1c to one of the power pin of the HDMI connector 13 and the input of the DC-to-DC converter 112. When the demultiplexer 11c selects to output to the power pin of the HDMI connector 13, the voltage of the power source 14 is the first voltage; otherwise, when the demultiplexer 11c selects to output to the DC-to-DC converter 112, the DC-to-DC converter 112 will convert the voltage of the power source 14 into the second voltage, which is then outputted to the power pin of the HDMI connector 13. In the preferred embodiments of FIGS. 1B and 1C, the second voltage is the specific voltage of the power signal of the HDMI, the first voltage is lower than the second voltage, and the threshold voltage can be configured equal to the first voltage or slightly lower than the first voltage.

Figure 2A:
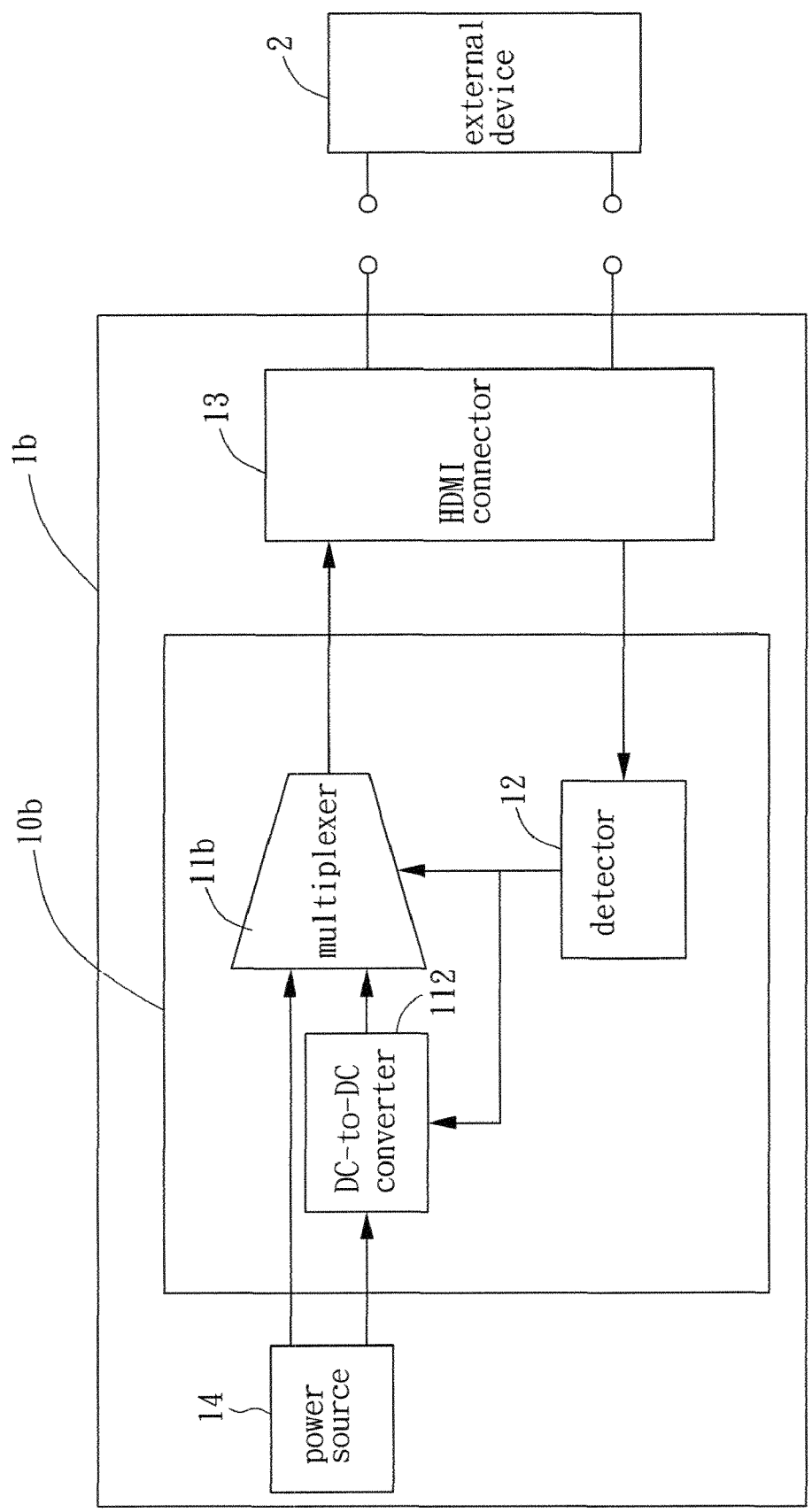
FIGS. 2A and 2B illustrate that the voltage controlling apparatus in FIG. 1B is connected to an external device via a HDMI connector.
Figure 2B:
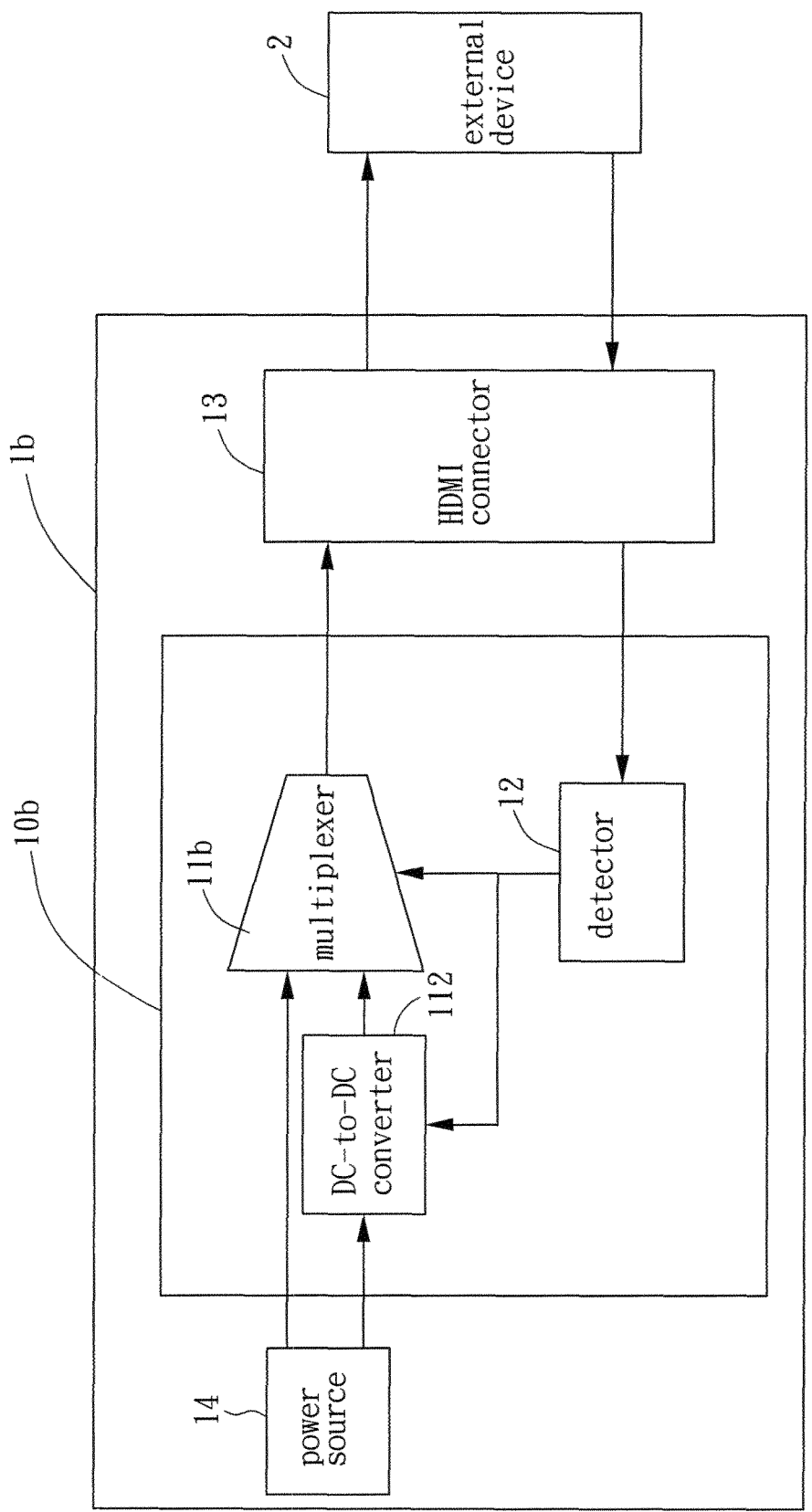

FIGS. 2A and 2B are used to illustrate how the voltage controlling apparatus 10b operates when the portable electronic device 1b is connected and not connected to the external device 2 via the HDMI connector 13, respectively. In FIG. 2A, the HDMI connector 13 is not yet connected to the external device 2, and thus the hot plug detect pin of the HDMI connector 13 is not connected to the external device 2, i.e. the hot plug detect pin is floating. At this time, since the detector 12 detects that the voltage of the hot plug detect pin is lower than the threshold voltage, the control signal generated by the detector 12 will control the multiplexer 11b to select the first voltage. That is, the DC-to-DC converter 12 does not perform the voltage conversion to save electric power, and the multiplexer 11b selects the voltage of the power source 14 for output. In FIG. 2B, the HDMI connector 13 is already connected to the external device 2. According to the HDMI specification, the power pin and the hot plug detect pin of the HDMI connector 13 and the HDMI connecting device (not shown) in the external device 2 form a loop. After the first voltage outputted from the power pin of HDMI connector 13 is sent to the hot plug detect pin of the HDMI connector 13 via the loop, the detector 12 detects that the voltage of the hot plug detect pin is not lower than the threshold voltage, and thus generates the control signal to control the multiplexer 11b to output the second voltage. That is, the DC-to-DC converter 12 converts the voltage of the power source 14 into the second voltage of 5 volts, which is then selected by the multiplexer 11b for outputting, thereby the voltage of the power pin can conform to the HDMI specification. On the other hand, the detector 12 enables the HDMI function of the portable electronic device 1b, so as to start the transmission of digital video and audio signals of HDMI format to the external device 2. In this manner, the power saving can be achieved when the HDMI is not enabled, while the HDMI specification can also be conformed when the HDMI is enabled.

In practical application, when the HDMI connector 13 is connected to the external device 2, the first voltage outputted from the power pin may undergo a voltage drop when sent to the hot plug detect pin via the loop formed with the external device 2. Thus, the threshold voltage needs to be configured as slightly lower than the first voltage, and the margin lower than the first voltage must be larger than the voltage drop. In this manner, when the HDMI connector 13 is connected to the external device 2, the detector 12 will determine that the voltage of the hot plug detect pin is not lower than the threshold voltage.

In FIG. 1C, when the voltage controlling apparatus 10c is not connected to an external device, the hot plug detect pin is floating. At this time, since the detector 12 detects that the voltage of the hot plug detect pin is lower than the threshold voltage, the control signal generated by the detector 12 will control the demultiplexer 11c to select the first voltage, that is, the demultiplexer 11c outputs the voltage of the power source 14 to the power pin of the HDMI connector 13 via according to the control signal, and the DC-to-DC converter 12 does not perform the voltage conversion to save electric power. On the other hand, when the portable electronic device 1c is connected to the external device, the power pin, the hot plug detect pin and the external device (not shown) form a loop via the HDMI connector 13. When the first voltage outputted from the power pin is sent to the hot plug detect pin via the loop, the detector 12 detects that the voltage of the hot plug detect pin is not lower than the threshold voltage, and thus generates the control signal to control the demultiplexer 11c. That is, according to the control signal, the demultiplexer 11c outputs the voltage of the power source 14 to the DC-to-DC converter 12 for converting the voltage of the power source 14 into the second voltage of 5 volts, which is then sent to the external device via the HDMI connector 13, thereby conforming to the HDMI specification. Similarly, the detector 12 also enables the HDMI function of the portable electronic device 1c, so as to start the transmission of digital video and audio signals of HDMI format to the external device. In this manner, the power saving can be achieved when the HDMI is not enabled, while the HDMI specification can also be conformed when the HDMI is enabled.

Figure 3:
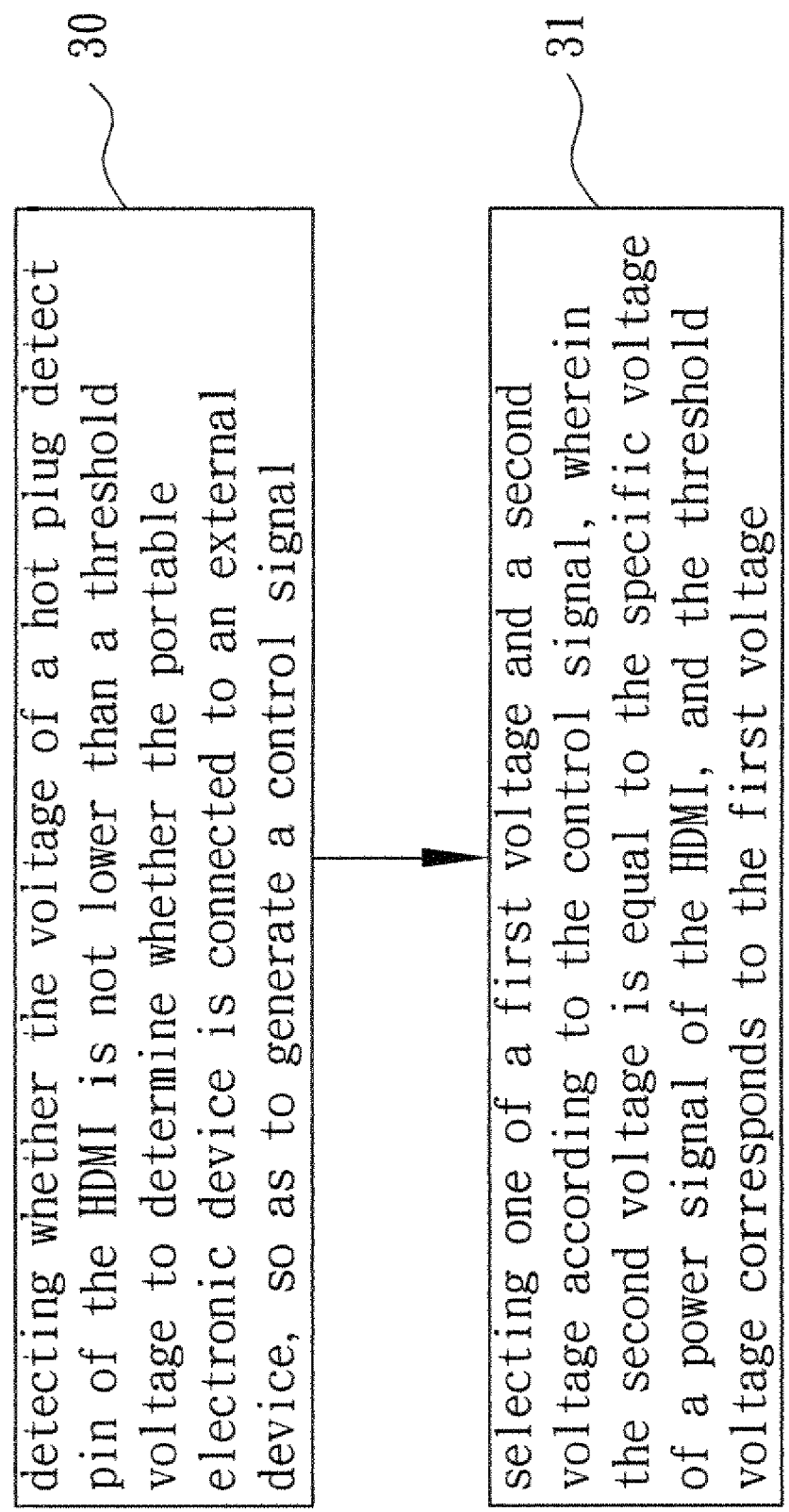
FIG. 3 shows a flow chart of a voltage controlling method according to an embodiment of the present invention.

FIG. 3 shows a flow chart of a voltage controlling method according to an embodiment of the present invention. The voltage controlling method can be used in a portable electronic device having the HDMI. The portable electronic device is capable of establishing a connection with an external device by the HDMI. The voltage controlling method includes the following steps:

Step 30: detecting whether the voltage of a hot plug detect pin of the HDMI is not lower than a threshold voltage to determine whether the portable electronic device is connected to an external device, so as to generate a control signal.

Step 31: selecting one of a first voltage and a second voltage according to the control signal, wherein the second voltage is equal to the specific voltage of a power signal of the HDMI, and the threshold voltage corresponds to the first voltage.

When step 30 detects that the voltage of the hot plug detect pin is not lower than the threshold voltage, step 31 selects the second voltage; when step 30 detects that the voltage of the hot plug detect pin is lower than the threshold voltage, step 31 selects the first voltage.

In a preferred embodiment, step 31 directly uses the voltage of the power source of the portable electronic device as the first voltage, and selectively converts the voltage of the power source into the second voltage according to the control signal. That is, when step 30 detects that the voltage of the hot plug detect pin is not lower than the threshold voltage, step 31 performs the voltage conversion; when step 30 detects that the voltage of the hot plug detect pin is lower than the threshold voltage, step 31 does not perform the voltage conversion so as to save electric power.

While the present invention has been shown and described with reference to the preferred embodiments thereof and in terms of the illustrative drawings, it should not be considered as limited thereby. Various possible modifications and alterations could be conceived of by persons skilled without departing from the scope and the spirit of the present invention.

What is claimed is:

1. An apparatus for voltage controlling used in a portable electronic device, comprising:
   a high-definition multimedia interface connector (HDMI connector) for establishing a connection with an external device, further having a hot plug detect pin and a power pin;
   a detector for detecting whether the connection is established by detecting a voltage of the hot plug detect pin and for comparing the voltage to a threshold voltage so as to generate a control signal accordingly, and
   a voltage selector for selecting one of a first voltage and a second voltage based on the control signal and outputting the one to the power pin;
   wherein the control signal orders the voltage selector to select the second voltage if the voltage is not lower than the threshold voltage, and to select the first voltage otherwise.

2. The apparatus of claim 1, wherein the apparatus uses a voltage of a power source of the electronic device as the first voltage.

3. The apparatus of claim 1, wherein the second voltage is equal to a voltage of a power signal of the HDMI.

4. The apparatus of claim 1, wherein the threshold voltage is lower than the first voltage.

5. The apparatus of claim 1 further comprising: a DC-to-DC converter for converting the first voltage into the second voltage.

6. The apparatus of claim 5, wherein the voltage selector is a multiplexer, which receives the first voltage and the second voltage, and then outputs said one of the first voltage and the second voltage based on the control signal.

7. The apparatus of claim 5, wherein the voltage selector is a demultiplexer, which receives the first voltage and then outputs the first voltage to said one of an output end of the electronic device and the DC-to-DC converter based on the control signal.

8. A method for voltage controlling used in a portable electronic device, comprising steps of:
   preparing a high-definition multimedia interface connector (HDMI connector) for establishing a connection between the portable electronic device and an external device, the HDMI connector further having a hot plug detect pin and a power pin
   a detector of the portable electronic device detecting whether the connection is established by detecting a voltage of the hot plug detect pin and for comparing the voltage to a threshold voltage so as to generate a control signal accordingly, and
   a voltage selector of the portable electronic device selecting one of a first voltage and a second voltage based on the control signal and outputting the one to the power pin; wherein the control signal orders the voltage selector to select the second voltage if the voltage is not lower than the threshold voltage, and to select the first voltage otherwise.

9. The method of claim 8, wherein the method uses a voltage of a power source of the electronic device as the first voltage.

10. The method of claim 8, wherein the second voltage is equal to a voltage of a power signal of the HDMI.

11. The method of claim 8, wherein the threshold voltage is lower than the first voltage.

12. The method of claim 8 further comprising steps of: a DC-to-DC converter converting the first voltage into the second voltage.

13. The method of claim 12, wherein the voltage selector is a multiplexer, which receives the first voltage and the second voltage, and then outputs said one of the first voltage and the second voltage based on the control signal.

14. The method of claim 12, wherein the voltage selector is a demultiplexer, which receives the first voltage and then outputs the first voltage to said one of an output end of the electronic device and the DC-to-DC converter based on the control signal.

* * * * *